United States Patent [19]
Huebler et al.

[11] Patent Number: 5,422,137
[45] Date of Patent: Jun. 6, 1995

[54] PRODUCTION OF A MAGNETIC RECORDING MEDIUM

[75] Inventors: Gerhard Huebler, Munich; Wolf-Dieter Schroeer, Holzhausen; Reinhard Kraetschmer, Landsberg; Josef Schelble, Munich, all of Germany

[73] Assignee: BASF Magnetics GmbH, Mannheim, Germany

[21] Appl. No.: 135,405

[22] Filed: Oct. 13, 1993

[30] Foreign Application Priority Data

Oct. 14, 1992 [DE] Germany .................. 42 34 608.8

[51] Int. Cl.6 .................. H01F 10/02; B05D 5/12
[52] U.S. Cl. .................. 427/122; 427/131; 427/385.5
[58] Field of Search .............. 427/131, 122, 385.5

*Primary Examiner*—Bernard Pianalto
*Attorney, Agent, or Firm*—Keil & Weinkauf

[57] ABSTRACT

A wet-on-wet application process by means of an extrusion coater having at least two slot dies is described, the upper lip of the common outlet orifice of the slot dies being recessed relative to the lower lip and a right parallelepiped magnet whose upper edge is opposite the extruder orifice at a distance of, preferably, from 1 to 1.5 mm away being arranged on the other side of the nonmagnetic substrate and parallel to the latter, in which the uppermost layer contains magnetic pigments and has a layer thickness of more than 2.0 μm while the lower layer is nonmagnetic, may contain a conductivity-increasing additive or nonmagnetic fillers and has a thickness of less than 0.5 μm when dry. The magnetic recording medium has very good mechanical and electroacoustic properties, improved conductivity, very good adhesion, improved surface quality and a smaller number of dropouts.

6 Claims, 1 Drawing Sheet

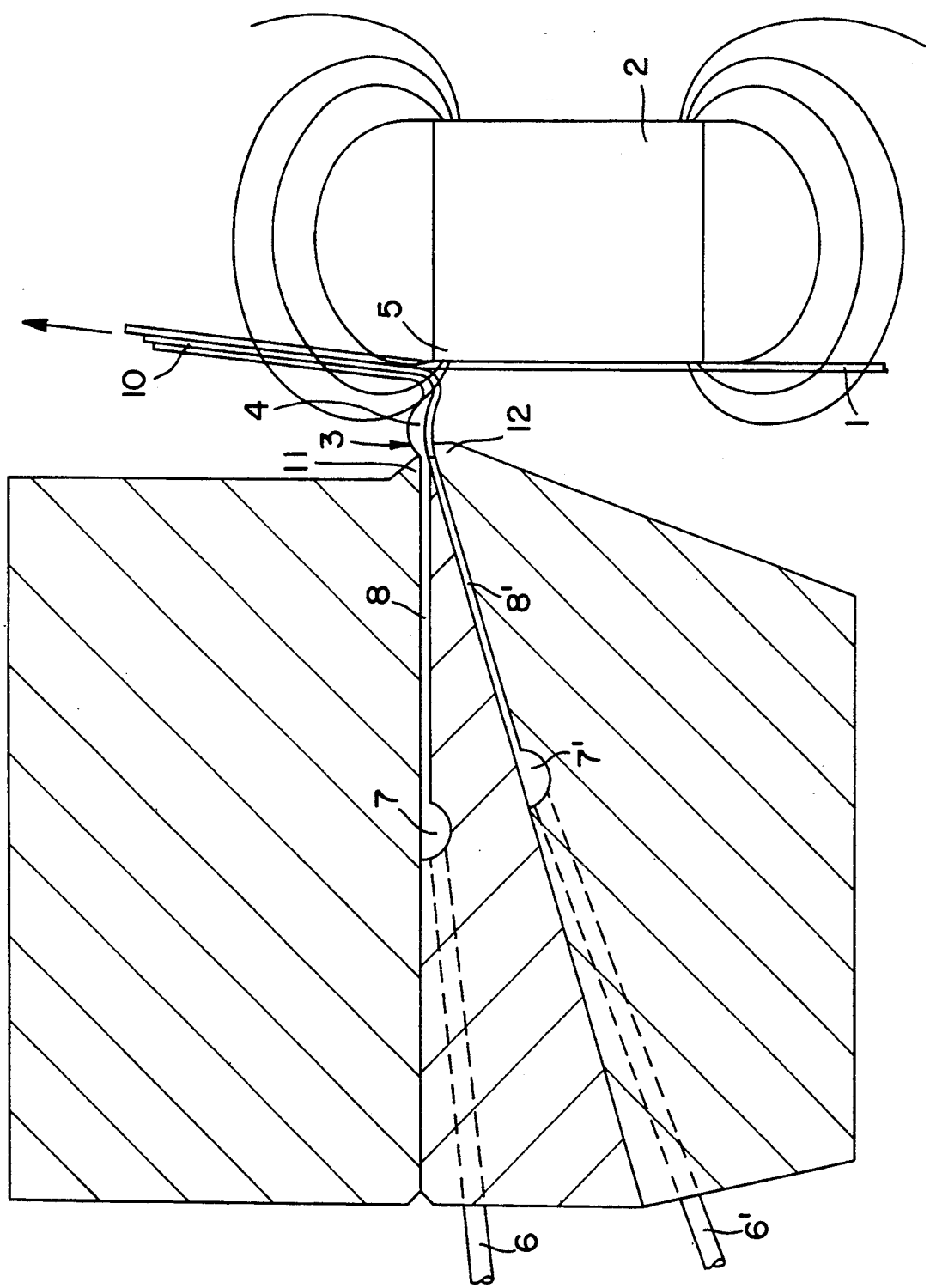

PRODUCTION OF A MAGNETIC RECORDING MEDIUM

The present invention relates to a process for the production of a magnetic recording medium by means of an extrusion coater having at least two slot dies for the wet-on-wet application of a plurality of layers one on top of the other, where the upper layer is magnetic and the lower layer may be nonmagnetic, to a flexible nonmagnetic substrate, the upper lip of the common outlet orifice of the slot dies being recessed relative to the lower lip and a parallelepiped magnet whose upper edge is opposite the extruder orifice being arranged behind the substrate and parallel to the latter.

Extrusion coaters for the simultaneous application of two layers one on top of the other have already been described in European Patent 0,392,810, German Patent 4,011,279 and U.S. Pat. Nos. 4,863,793 and 5,072,688. Here, two different dispersions flow one on top of the other within the coating block and emerge from the extruder orifice as a double layer without mixing, directly onto the substrate moving freely past the extruder orifice. The layer fills the space between substrates and coater orifice. The constancy of the wet layer thickness over the width and length of the web is controlled by the uniformity of the metered amount and the movement of the substrate. Owing to system-related fluctuations in these properties, deviations in the wet layer thickness of up to several $\mu$m may occur, this being far too high in the case of wet layer thicknesses of about 10 $\mu$m, as required for modern magnetic tapes.

Furthermore, this scraping layer system is susceptible to coating defects due to loose particles lying on the substrate. Moreover, the coating system must be swivelled away when bonded areas in the web pass through.

In addition, such arrangements have the fundamental restriction that, when applying double layers, the lower layer must have a thickness of at least 0.5 $\mu$m, as already stated in the abovementioned German Patent 4,011,279 and U.S. Pat. No. 4,863,793.

There is therefore an urgent need to improve the mechanical properties, such as surface smoothness, adhesion and abrasion resistance, of magnetic recording media with a very thin nonmagnetic lower layer.

It is also known that the electrical conductivity of magnetic tapes is very important for many applications. The intensive friction between the magnetic tape surfaces and the contact elements during operation gives rise to charges which cannot flow away sufficiently rapidly if the insulating property of the tape is too good, and may interfere with the recording and playback process as a result of irregular discharge phenomena. On the other hand, if any conductive backing coating present has a conductivity which differs too greatly from that of the magnetic layer (about $\geq 10^6$ $\Omega/\square$), a capacitor effect occurs as a result of a charge build-up at the magnetic layer/film interface and may lead to a considerable tendency of the tape to stick to the contact elements and hence may have a substantial adverse effect on the running properties of the tape in a recorder.

The conductivity of a magnetic layer can be brought into the desired range (as a rule $\leq 10^9$ $\Omega/\square$) by adding carbon black as a layer component. However, concentrations of 5–10% of carbon black (based on pigment) must be added here in order to achieve sufficient conductivity. This signifies a dilution of the effective ferromagnetic material and hence an adverse effect on the storage quality.

Another method for adjusting the conductivity of the magnetic layer is to introduce a carbon black-containing conductive intermediate layer between the film and the magnetic layer. This can be done in two ways.

1. The carbon black layer is first cast and the magnetic layer is applied to the dry carbon black layer. This requires two separate operations and is therefore uneconomical.
2. Both layers are cast in succession one on top of the other in the wet state. Here, owing to their small size, the carbon black particles migrate into the cavities of the pigment framework of the magnetic layer present on top, this taking place prior to drying. Uncontrollable conditions which do not permit constant production occur.

It is an object of the present invention to produce a conductive magnetic recording medium which can be prepared in one operation and does not suffer any impairment of the storage quality.

The same object is to be achieved in order to introduce a layer additive to reduce the light transparency.

German Patent 1,907,212 furthermore describes an extrusion coating process which avoids the effect of the varying contact pressure of the film by virtue of the fact that the substrate is guided at a distance of about 1 mm from the extruder orifice over the pole of a magnet. The magnetic dispersion emerging from the extruder orifice is attracted toward the substrate by the effect of the magnet edge located directly behind the film web. In this case, the uniformity of the thickness over the width still depends on the constancy of the metered amount, which is subject to fluctuations. When precision metering pumps are used, the problem is reduced to the constancy of the amount delivered over the web width. Furthermore, in the case of the apparatus described, it is only possible to apply a single layer.

The German Application P 42 26 139 describes an extrusion coater having at least two slot dies and a common cutlet orifice, in which the upper lip of the outlet orifice is recessed by from 0.5 to 1.5 mm relative to the lower lip, in which the extruder orifice is preferably from 1 to 1.5 mm away from the edge of the magnet and in which the field gradient of the magnetic field aligned with the extruder slot and the field strength of the magnet in the running direction of the coated substrate have certain values.

it is an object of the present invention to produce a double layer by means of an extrusion coater by the wet-on-wet process, in which the upper layer contains magnetizable pigments while the lower layer is preferably nonmagnetic, may contain additives for increasing the conductivity or reducing the light transparency and can be applied very thin, the problems mentioned in the prior art being avoided.

BRIEF DESCRIPTION OF THE DRAWING

The drawing shows an extrusion coater, as described in the cited application PCT/EP 93/02017, showing: the substrate (1) onto which the extruded layers are deposited; a coating magnet (2) past whose polarized surface the substrate travels; the outlet orifice (3), aimed more or less perpendicular to the substrate (1) and opposite the upper corner (5) of the magnet; supply channels (6, 6'), supplying the magnetizable, magnetic pigment-containing upper layer and the nonmagnetizable lower layer materials, respectively; distribution chambers (7, 7'), which spread out the materials to the extrusion slots (8, 8'); the common outlet orifice (3), the upper lip (11) of which is recessed relative to its lower lip (12); and the magnetic dispersion (10), deposited on the substrate (1).

We have found, surprisingly, that this object is achieved by an extrusion coater corresponding to copending PCT patent application No. PCT/EP 93/02017, filed Jul. 29, 1993 by the same assignee although it was not expected that the coating magnet would also apply the nonmagnetic lower layer in such a small layer thickness simultaneously with the magnetizable layer to the substrate, without coating problems.

The extrusion coating arrangement is described in detail in the German application P 42 26 139 (corresponding to copending PCT patent application No. PCT/EP 92/02017, filed Jul. 29, 1993 by the same assignee) already mentioned repeatedly, so that no further discussion is necessary here. The Examples which follow illustrate the novel process without restricting the invention thereto.

There are in principle no restrictions with regard to the composition of the upper layer containing magnetic pigments or of the lower nonmagnetic layer.

The magnetic pigments disclosed in the prior art, such as iron oxide, Co-doped iron oxide, metal pigments and alloys, chromium dioxide, etc., may be used, and the conventional polymeric binders or binder mixtures and the other additives, such as dispersants, nonmagnetic pigments, lubricants, curing agents and wetting agents, may be employed.

The lower layer may furthermore contain the conventional binders, such as polyesters, polyesterurethane, polyurethane, vinylidene chloride/acrylonitrile copolymers, vinyl chloride/vinyl acetate copolymers, etc. It also performs the function of an adhesion-promoting layer. Suitable nonmagnetic fillers are conductive carbon blacks, pigment carbon blacks or hydroquinone, $\alpha$-$Fe_2O_3$, $TiO_2$, $SiO_2$, $Al_2O_3$ and other conventional pigments or dulling agents. Examples of these are given in U.S. Pat. No. 4,863,793.

However, the lower layer may also contain magnetizable pigments, such as the abovementioned ones, in order to achieve the objects of the invention.

Since the upper layer is advantageously applied without carbon black or the other stated additives, a high packing density and good storage properties are obtained.

EXAMPLE 1

| Composition of the upper layer (UL) | Parts by wt. |
|---|---|
| $\gamma$-$Fe_2O_3$, $_iH_c$ 27.2 kA/m, BET value = 17 $m^2$/g | 100 |
| Polyesterpolyurethane | 24 |
| Cellulose derivative | 2.7 |
| Dispersant | 1.4 |
| Carbon black, particle size 20 nm, BET 120 $m^2$/g | 3.6 |
| $SiO_2$, BET 650 $m^2$/g | 1 |
| Lubricant | 0.6 |
| Solvent: tetrahydrofuran | 260 |

The viscosity of the dispersion is 2,000 mPa.s.

| Composition of the lower layer (LL) | Parts by wt. |
|---|---|
| Vinylidene chloride/acrylonitrile copolymer | 25 |

-continued

| Composition of the lower layer (LL) | Parts by wt. |
|---|---|
| Solvent: tetrahydrofuran | 75 |

The viscosity of the binder solution is 600 mPa.s.

The two compositions were cast onto a 30 $\mu$m thick polyethylene terephthalate substrate by means of the extrusion coating arrangement described in the German application P 42 26 139, from two slot dies at a rate of 80 m/min and in a width of 650 mm, and the layers were dried and were calendered in a conventional calender arrangement. The thickness of the upper layer when dry was 16 $\mu$m and the thickness of the lower layer when dry was 0.25 $\mu$m.

The resulting magnetic recording medium was then slit longitudinally into the ¼ inch width used and was subjected to the conventional electroacoustic and mechanical tests.

For this purpose, a ¼ inch wide test tape is wound on a winding table in the fast winding mode at 8 m/sec, the free tape end striking a tape guide part of the winding apparatus.

That area of the magnetic layer which is flaked off at the tape end is rated using a qualitative scale, more severe flaking indicating reduced adhesion of the magnetic layer to the substrate.
Rating 0: No flaking
Rating 1: Flaking visible only under the microscope
Rating 2: Flaking over 2–3 $mm^2$
Rating 3: Flaking over 20–30 $mm^2$
Rating 4: Flaking over more than 30 $mm^2$.

The double layer having the novel composition gave the rating 1 in the stated lashing test, whereas the upper layer without the lower layer receives the rating 4 in the same test.

EXAMPLE 2

The composition of the upper layer (UL) was as in Example 1, while the lower layer (LL) had the following composition.

|  | Parts by weight |
|---|---|
| Polyester | 32 |
| Tetrahydrofuran | 68 |

The binder solution had a viscosity of 500 mPa.s.

The double layer was cast similarly to Example 1 by double extrusion at a rate of 60 m/min, the thickness of the upper layer being 16 $\mu$m and that of the lower layer being 0.45 $\mu$m.

The double layer gave a layer adhesion of 93 cN/mm tape width, whereas the upper layer without the lower layer had a layer adhesion of only 61 cN/mm. The layer adhesion was measured by sticking a self-adhesive tape to the upper layer in each case and then peeling it off at a constant rate. The force required for peeling is a measure of the layer adhesion.

EXAMPLE 3

The composition of the upper layer (UL) was as in Example 1, while the lower layer (LL) had the following composition:

|  | Parts by weight |
|---|---|
| Polyesterpolyurethane | 150 |

-continued

| | Parts by weight |
|---|---|
| Carbon black (mean particle size 20 nm, BET 120 m²/g) | 60 |
| Tetrahydrofuran | 870 |
| Cyclohexanone | 155 |

The viscosity of the carbon black dispersion was 600 mPa.s.

The double layer was cast as in Example 1 at a rate of 60 m/min, the thickness of the upper layer being 16 μm and the thicknesses of the lower layer being 0.45 μm and 0.3 μm.

The following results were obtained:

| Structure | Layer resistance |
|---|---|
| a) UL 16 μm, no LL | $5 \times 10^9$ Ω/□ |
| b) UL 16 μm, LL 0.45 μm | $1 \times 10^7$ Ω/□ |
| c) UL 16 μm, LL 0.3 μm | $1 \times 10^9$ Ω/□ |

Even with a lower layer only 0.3 μm thick, a considerable reduction in the layer resistance was thus achieved without it being necessary to add the carbon black to the upper layer containing the magnetic pigment.

EXAMPLE 4

| Composition of the upper layer | Parts by wt. |
|---|---|
| γ-Fe₂O₃, ($_fH_c$ 29.5 kA/m, BET 20 m²/g) | 100 |
| Polyesterurethane | 11 |
| Vinyl copolymer (VAGH) | 9 |
| Dispersant | 2.5 |
| Lubricant | 1 |
| Tetrahydrofuran | 180 |
| Diisocyanate crosslinking agent | 1 |

The viscosity of the dispersion was 2,500 mPa.s.

| Composition of the lower layer (LL) | Parts by wt. |
|---|---|
| Polyesterurethane | 97 |
| Titanium dioxide (BET 10 m²/g) | 225 |
| Tetrahydrofuran | 642 |

The viscosity of the dispersion was 590 mPa.s.

As in the previous Examples, the double layer was cast by double extrusion at a rate of 100 m/min on a 12 μm thick polyethylene terepthalate substrate, the thickness of the upper layer being 5 μm and that of the lower layer being 0.45 μm and 0.25 μm.

As shown in the Table below, the surface quality, measured by the maximum output level at short wavelength (10 kHz), of the magnetic upper layer is improved by the lower layer.

| Layer thickness | | | |
|---|---|---|---|
| UL | LL | SOL₁₀ ₖHz | Layer adhesion (Rating) |
| 5 μm | — | −8 dB | 4 |
| 5 μm | 0.25 μm | −7.3 dB | 2 |
| 5 μm | 0.45 μm | −7 dB | 2 |

EXAMPLE 5

| Composition of the upper layer (UL) | Parts by wt. |
|---|---|
| Co-doped iron powder (BET = 58 m²/g, $_fH_c$ = 125 kA/m) | 65 |
| Vinyl chloride copolymer | 9 |
| Polycarbonatepolyurethane | 9 |
| Carboxylic acid-containing polyalkylene oxide acrylate | 4 |
| α-Al₂O₃ | 7 |
| Lubricant | 2 |
| Dispersant | 2 |
| Diisocyanate | 2 |
| Tetrahydrofuran | 220 |

The viscosity of the dispersion was 2,500 mPa.s.

| Composition of the lower layer (LL) | Parts by wt. |
|---|---|
| Carbon black (BET = 265 m²/g, mean particle size 18 nm) | 30 |
| Vinylidene chloride copolymer | 27 |
| Polyesterurethane | 23 |
| Silica (BET = 200 m²/g, mean particle size 40 nm) | 8 |
| Dispersant | 1 |
| Lubricant | 1 |
| Diisocyanate | 10 |
| Tetrahydrofuran | 250 |

The viscosity of the dispersion was 200 mPa.s.

As in the previous Examples, the two layers were applied by double extrusion at a rate of 100 m/min on a 7 μm thick polyethylene terephthalate substrate. The thickness of the upper layer was 3.0 μm and that of the lower layer was 0.4 μm.

The resulting magnetic recording medium was then slit to a width of 8 mm and was subjected to the conventional tests for an 8 mm video tape.

COMPARATIVE EXAMPLE 6

The procedure was as in Example 5, except that the lower layer and the upper layer were applied in two passes, the upper layer being cast on the already dried lower layer.

COMPARATIVE EXAMPLE 7

The procedure was as in Example 5, except that the lower layer was omitted.

The following results were obtained.

| | Surface resistance (Ω/□) | Luminance S/N (dB) | Dropout (min⁻¹) |
|---|---|---|---|
| Example 5 | $10^4$ | +1.0 | 15 |
| Comparative Example 6 | $10^5$ | −1.2 | 20 |
| Comparative Example 7 | $10^{10}$ | −0.8 | 40 |

We claim:

1. A process for the production of a magnetic recording medium by means of an extrusion coater having at least two slot dies, with a common outlet orifice having upper and lower lips, for the wet-on-wet application of a plurality of layers one on top of the other to a flexible nonmagnetic substrate, the upper lip of the common outlet orifice of the slot dies being recessed relative to the lower lip and a right parellelepiped magnet whose upper edge is opposite the extruder orifice at a distance of from 0.1 to 5 mm being arranged behind the substrate and parallel to the latter, wherein an uppermost magnetizable layer has a thickness of more then 2.0 μm when dry and the adjacent lower layer has a thickness of less than 0.5 μm when dry.

2. A process for the production of a magnetic recording medium as claimed in claim 1, wherein the viscosity of the upper layer is 500–5,000 mPa.s and that of the lower layer is 50–2,000 mPa.s.

3. A process for the production of a magnetic recording medium as claimed in claim 1, wherein the polymeric binder of the lower layer is a vinylidene chloride/acrylonitrile copolymer, a polyester, a polyurethane or a vinyl chloride copolymer.

4. A process for the production of a magnetic recording medium as claimed in claim 1, wherein the lower layer contains a conductivity-increasing or transparency-reducing additive.

5. A process as claimed in claim 4, wherein the additive is carbon black or hydroquinone.

6. A process for the production of a magnetic recording medium as claimed in claim 1, wherein the lower layer contains a nonmagnetic filler.

* * * * *